United States Patent
Nagakura et al.

(10) Patent No.: US 11,358,033 B2
(45) Date of Patent: Jun. 14, 2022

(54) GOLF BALL

(71) Applicant: Sumitomo Rubber Industries, Ltd., Kobe (JP)

(72) Inventors: Hikaru Nagakura, Kobe (JP); Kazuyoshi Shiga, Kobe (JP); Kai Hayashi, Kobe (JP); Takahiro Shigemitsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/869,991

(22) Filed: May 8, 2020

(65) Prior Publication Data
US 2020/0353316 A1 Nov. 12, 2020

(30) Foreign Application Priority Data
May 10, 2019 (JP) .............................. JP2019-089955

(51) Int. Cl.
*A63B 37/06* (2006.01)
*A63B 37/00* (2006.01)
*C08L 9/00* (2006.01)

(52) U.S. Cl.
CPC ...... *A63B 37/0051* (2013.01); *A63B 37/0063* (2013.01); *A63B 37/0064* (2013.01); *A63B 37/0065* (2013.01); *A63B 37/0074* (2013.01); *C08L 9/00* (2013.01); *C08L 2205/18* (2013.01); *C08L 2312/02* (2013.01)

(58) Field of Classification Search
CPC .......................... A63B 37/005; A63B 37/0051
USPC ....................................................... 473/371
See application file for complete search history.

(56) References Cited

U.S. PATENT DOCUMENTS

2011/0028246 A1 2/2011 Kimura
2020/0001143 A1* 1/2020 Shindo ............... A63B 37/0077

FOREIGN PATENT DOCUMENTS

| JP | 7-51403 A | 2/1995 |
| JP | 2001-149504 A | 6/2001 |
| JP | 2004-121815 A | 4/2004 |
| JP | 2011-31038 A | 2/2011 |

* cited by examiner

*Primary Examiner* — Raeann Gorden
(74) *Attorney, Agent, or Firm* — Birch, Stewart, Kolasch & Birch, LLP

(57) ABSTRACT

An object of the present invention is to provide a golf ball having excellent durability. The present invention provides a golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a hindered phenol compound, and (b) the co-crosslinking agent and (d) the hindered phenol compound are blended in the core rubber composition such that the following expression (1) is satisfied:

$$0.04 \leq HF/B \leq 0.35 \quad (1)$$

in the formula (1), HF=a number of OH functional group in one molecule of (d) the hindered phenol compound× an amount of (d) the hindered phenol compound (mole) with respect to 100 parts by mass of (a) the base rubber, and B=an amount of (b) the co-crosslinking agent (mole) with respect to 100 parts by mass of (a) the base rubber.

10 Claims, 1 Drawing Sheet

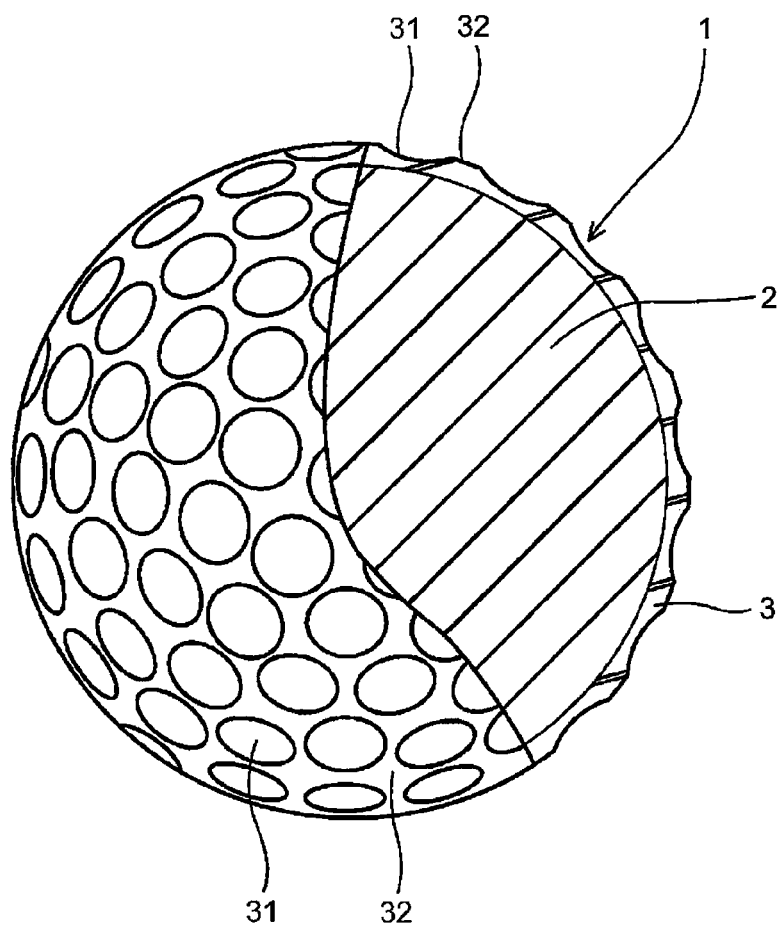

GOLF BALL

FIELD OF THE INVENTION

The present invention relates to a golf ball, more specifically relates to a technology for improving a core of a golf ball.

DESCRIPTION OF THE RELATED ART

As a material for forming a core of a golf ball, a rubber composition containing a base rubber, a co-crosslinking agent and a crosslinking initiator is widely used in light of its good resilience.

For example, JP 2011-31038 A discloses a golf ball comprising a core formed by vulcanizing a rubber composition and a cover formed from a material mainly containing a polyurethane material, wherein the rubber composition of the core contains 100 parts by mass of a rubber base material, 10 to 40 parts by mass of an unsaturated carboxylic acid or a metal salt thereof, a peroxy ketal and a monophenol-based antioxidant, and a mixing ratio (a)/(b) of the peroxy ketal (a) to the monophenol-based antioxidant (b) ranges from 5 to 50 in a mass ratio.

In addition, JP H7-51403 A discloses a one-piece solid golf ball having a ball body formed from a composition containing a base rubber, an α,β-unsaturated carboxylic acid and/or a metal salt thereof, an organic peroxide and a filler, wherein 2 to 12 parts by weight of titanium oxide with respect to 100 parts by weight of the base rubber and 0.0001 to 0.04 part by weight of a blue pigment and violent pigment with respect to 100 parts by weight of the base rubber are blended in the composition, and a clear paint containing an antioxidant and/or a light stabilizer is applied to the ball body.

JP 2004-121815 A discloses a golf ball comprising, as a constituent element, a heat-molded product of a rubber composition containing a polybutadiene having a cis-1,4 bond in a proportion of 60 weight % or more and a Mooney viscosity ($ML_{1+4}$(100° C.)) of 40 or more, an unsaturated carboxylic acid and/or a metal salt thereof, an organic peroxide, and a monophenol-based antioxidant.

JP 2001-149504 A discloses a one-piece golf ball composed of a ball body and a clear coat applied on a surface of the ball body, wherein the ball body is formed from a white rubber composition containing a base rubber, an α,β-unsaturated carboxylic acid and/or a metal salt thereof, and an organic peroxide, the white rubber composition is a rubber composition containing an antioxidant in an amount of from 0.1 to 5.0 parts by mass and a light stabilizer in an amount of from 0.05 to 3.0 parts by mass with respect to 100 parts by mass of the base rubber, and the clear coat contains an ultraviolet light absorbent in an amount of 0.05 to 5.0 parts by mass with respect to 100 parts by mass of a resin component.

SUMMARY OF THE INVENTION

The object of the present invention is to provide a golf ball having excellent durability by improving a core.

The present invention provides a golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a hindered phenol compound, and (b) the co-crosslinking agent and (d) the hindered phenol compound are blended in the core rubber composition such that the following expression (1) is satisfied:

$$0.04 \leq HF/B \leq 0.35 \qquad (1)$$

in the formula (1), HF=a number of OH functional group in one molecule of (d) the hindered phenol compound×an amount (mole) of (d) the hindered phenol compound with respect to 100 parts by mass of (a) the base rubber, and B=an amount (mole) of (b) the co-crosslinking agent with respect to 100 parts by mass of (a) the base rubber.

According to the present invention, a golf ball having excellent durability is provided.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a hindered phenol compound, and (b) the co-crosslinking agent and (d) the hindered phenol compound are blended in the core rubber composition such that the following expression (1) is satisfied:

$$0.04 \leq HF/B \leq 0.35 \qquad (1)$$

in the formula (1), HF=a number of OH functional group in one molecule of (d) the hindered phenol compound×an amount (mole) of (d) the hindered phenol compound with respect to 100 parts by mass of (a) the base rubber, and B=an amount (mole) of (b) the co-crosslinking agent with respect to 100 parts by mass of (a) the base rubber.

The above HF/B is more preferably 0.04 or more, even more preferably 0.06 or more, and is more preferably 0.35 or less, and even more preferably 0.32 or less. If the value of the HF/B falls within the above range, the durability is better.

The core rubber composition used in the present invention preferably further satisfies the following expression (2):

$$0.005 \leq HF \leq 0.09 \qquad (2)$$

in the formula (2), HF=the number of OH functional group in one molecule of (d) the hindered phenol compound×the amount (mole) of (d) the hindered phenol compound with respect to 100 parts by mass of (a) the base rubber.

The above HF is more preferably 0.005 or more, even more preferably 0.007 or more, and is more preferably 0.09 or less, even more preferably 0.085 or less. If the value of the HF/B falls within the above range, the durability is better.

[(a) Base Rubber]

As (a) the base rubber, a natural rubber and/or a synthetic rubber can be used. For example, a polybutadiene rubber, a natural rubber, a polyisoprene rubber, a styrene polybutadiene rubber, or an ethylene-propylene-diene rubber (EPDM) can be used. These rubbers may be used solely, or at least two of these rubbers may be used in combination. Among them, typically preferred is a high cis-polybutadiene having a cis-1,4 bond in an amount of 40 mass % or more, preferably 80 mass % or more, more preferably 90 mass % or more, and even more preferably 95 mass % or more in view of its superior resilience.

From the viewpoint of obtaining a core having higher resilience, the amount of the high-cis polybutadiene in the base rubber is preferably 60 mass % or more, more preferably 80 mass % or more, and even more preferably 90 mass % or more. It is also preferable that (a) the base rubber consists of the high-cis polybutadiene.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably a polybutadiene synthesized using a rare earth element catalyst. When a neodymium catalyst, which employs a neodymium compound that is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}(100°$ C.)) of 30 or more, more preferably 32 or more, even more preferably 35 or more, and preferably has a Mooney viscosity ($ML_{1+4}(100°$ C.)) of 140 or less, more preferably 120 or less, even more preferably 100 or less, and most preferably 55 or less. It is noted that the Mooney viscosity ($ML_{1+4}(100°$ C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.0 or less. If the molecular weight distribution (Mw Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

[(b) Co-Crosslinking Agent]

(b) The α,β-unsaturated carboxylic acid having 3 to 8 carbon atoms and/or the metal salt thereof used in the core rubber composition is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid and crotonic acid.

Examples of the metal ion constituting the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other metal ion such as tin and zirconium. The above metal component may be used solely or as a mixture of at least two of them. Among them, the divalent metal ion such as magnesium, calcium, zinc, barium and cadmium is preferably used as the metal component. This is because if the divalent metal salt of the α,β-unsaturated carboxylic acid having 3 to 8 carbon atoms is used, a metal crosslinking easily generates between the rubber molecules. Especially, as the divalent metal salt, zinc acrylate is preferable, because zinc acrylate enhances the resilience of the obtained golf ball. It is noted that the α,β-unsaturated carboxylic acid having 3 to 8 carbon atoms and/or the metal salt thereof may be used solely or as a mixture of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than parts by mass, the amount of (c) the crosslinking initiator which will be described later must be increased such that the core formed from the core rubber composition has an appropriate hardness, which tends to lower the resilience of the obtained golf ball. On the other hand, if the amount of the α,β-unsaturated carboxylic acid having 3 to 8 carbon atoms and/or the metal salt thereof is more than 50 parts by mass, the core formed from the core rubber composition becomes so hard that the shot feeling of the obtained golf ball may be lowered.

The amount of (b) the α,β-unsaturated carboxylic acid having 3 to 8 carbon atoms and/or the metal salt thereof is preferably 0.12 mole or more, more preferably 0.13 mole or more, and even more preferably 0.14 mole or more, and is preferably 0.30 mole or less, more preferably 0.29 mole or less, and even more preferably 0.28 mole or less, with respect to 100 parts by mass of (a) the base rubber. If the amount of (b) the α,β-unsaturated carboxylic acid having 3 to 8 carbon atoms and/or the metal salt thereof falls within the above range, the durability is better while obtaining an appropriate core hardness.

[(c) Crosslinking Initiator]

(c) The crosslinking initiator used in the core rubber composition is blended to crosslink (a) the base rubber component. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. These organic peroxides may be used solely or as a mixture of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the crosslinking initiator is less than 0.2 part by mass, the core formed from the core rubber composition is so soft that the resilience of the obtained golf ball tends to be lowered, and if the amount of the crosslinking initiator is more than 5.0 parts by mass, the amount of (b) the co-crosslinking agent described above must be decreased such that the core formed from the core rubber composition has an appropriate hardness, which tends to lower the resilience or worsen the durability of the obtained golf ball.

[(d) Hindered Phenol Compound]

The hindered phenol compound is a compound having a hydroxyphenyl structure with a hydroxy group thereof being sterically protected by a bulky functional group. The bulky functional group preferably exists at a location adjacent to the hydroxy group. Examples of the bulky functional group include t-butyl group, and a long chain alkyl group optionally having a part of the carbon atoms thereof substituted with a sulfur atom. As the hindered phenol compound, a compound having a tert-butylhydroxyphenyl structure with at least one tert-butyl group is preferable, a compound having a di-tert-butylhydroxyphenyl structure with two tert-butyl groups is more preferable.

Examples of the compound having the tert-butylhydroxyphenyl structure with at least one tert-butyl group include compounds having a structure such as 3-tert-butyl-4-hydroxyphenyl or 3,5-di-tert-butyl-4-hydroxyphenyl. Among them, the compound having 3,5-di-tert-butyl-4-hydroxyphenyl structure is preferable.

Specific examples of the hindered phenol compound include a compound having one hydroxyphenyl structure, such as dibutylhydroxy toluene (BHT: 3,5-di-tert-butyl-4-hydroxytoluene), 4,6-bis(octylthiomethyl)-o-cresol, 4,6-bis[(dodecylthio)methyl]-o-cresol, 2,4-dimethyl-6-(1-methylpentadecyl) phenol (e.g. Irganox 1141 available from BASF Japan Ltd.), and octadecyl-3-(3,5-di-t-butyl-4-hydroxyphenyl) propionate (e.g. AO-50 available from Adeka Corporation).

Other specific examples of the hindered phenol compound include a compound having two hydroxyphenyl structures, such as 2,2'-methylene bis(4-ethyl-6-tert-butylphenol) (e.g. YOSHINOX 425 available from Mitsubishi Chemical Corporation), 2,2'-methylene bis(4-methyl-6-tert-butylphenol) (e.g. Sandant 2246 available from Sanshin Chemical Industry Co., Ltd.), 4,4'-butylidene bis(3-methyl-6-tert-butylphenol) (e.g. YOSHINOX BB available from Mitsubishi Chemical Corporation), 4,4'-thiobis(3-methyl-6-tert-butylphenol) (e.g. NOCRAC 300 available from Ouchi Shinko Chemical Industrial Co., Ltd.), 4,4-methylene bis(2,6-di-tert-butylphenol), 2,6-di-tert-butyl-4-({2-[(3,5-di-tert-butyl-4-hydroxyphenyl) sulfanyl]propane-2-yl} sulfanyl) phenol (probucol), and 3,9-bis[2-[3-(3-tert-butyl-4-hydroxy-5-methylphenyl) propionyloxy]-1,1-dimethylethyl]-2,4,8,10-tetraoxaspiro[5.5] undecane (e.g. ADK STAB AO-80 available from Adeka Corporation).

Other specific examples of the hindered phenol compound include a compound having three hydroxyphenyl structures, such as 1,3,5-tris-(3,5-di-tert-butyl-4-hydroxybenzyl)-1,3,5-triazine-2,4,6(1H,3H,5H-)-trione (e.g. ADK STAB AO-20 available from Adeka Corporation), and 1,3,5-trimethyl-2,4,6-tris(3,5-di-t-butyl-4-hydroxybenzyl) benzene (e.g. ADK STAB AO330 available from Adeka Corporation).

Other specific examples of the hindered phenol compound include a compound having four hydroxyphenyl structures, such as pentaerythritol tetrakis[3-(3,5-di-tert-butyl-4-hydroxyphenyl) propionate] (e.g. ADK STAB AO-60 available from Adeka Corporation).

The hindered phenol compound may be used solely, or two or more of them may be used in combination.

As the hindered phenol compound, at least one compound selected from the group consisting of dibutylhydroxy toluene, octadecyl-3-(3,5-di-tert-butyl-4-hydroxyphenyl) propionate, 4,4'-methylene bis(2,6-di-tert-butylphenol), 2,6-di-tert-butyl-4-({2-[(3,5-di-tert-butyl-4-hydroxyphenyl) sulfanyl] propane-2-yl} sulfanyl) phenol, 1,3,5-tris(3,5-di-tert-butyl-4-hydroxybenzyl)-1,3,5-triazine-2,4,6-(1H,3H,5H)-trione, and pentaerythritol tetrakis[3-(3,5-di-tert-butyl-4-hydroxyphenyl) propionate is preferable.

The amount of (d) the hindered phenol compound is preferably 1 part by mass or more, more preferably 2 parts by mass or more, and even more preferably 3 parts by mass or more, and is preferably 20 parts by mass or less, more preferably 18 parts by mass or less, and even more preferably 15 parts by mass or less, with respect to 100 parts by mass of (a) the base rubber. If the amount of (d) the hindered phenol compound falls within the above range, the durability is better while obtaining an appropriate core hardness.

[(e) Organic Sulfur Compound]

The core rubber composition preferably further contains (e) an organic sulfur compound. If (e) the organic sulfur compound is contained, the obtained core has enhanced resilience.

As (e) the organic sulfur compound, at least one compound selected from the group consisting of thiols (thiophenols, thionaphthols), polysulfides, thiurams, thiocarboxylic acids, dithiocarboxylic acids, sulfenamides, dithiocarbamates, and thiazoles, is preferable.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol and pentaiodothiophenol; and metal salts thereof. As the metal salt, zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Among them, 2-thionaphthol, 1-thionaphthol, and metal salts thereof are preferable. As the metal salt, a divalent metal salt is preferable, zinc salt is more preferable. Specific examples of the metal salt include zinc salt of 1-thionaphthol and zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachorophenyl) disulfide, bis(4-bromophenyl) disulfide, bis(2,5-dibromophenyl) disulfide, bis(2,6-dibromophenyl) disulfide, bis (2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide; thiuram disulfides such as tetramethylthiuram disulfide, tetraethylthiuram disulfide and tetrabutylthiuram disulfide; and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (e) the organic sulfur compound, the thiophenols and/or the metal salts thereof, the thionaphthols and/or the metal salts thereof, the diphenyl disulfides, and the thiuram disulfides are preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide are more preferable.

(e) The organic sulfur compound may be used solely, or two or more of them may be used in combination.

The amount of (e) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained, and the resilience of the golf ball may not be enhanced. In addition, if the amount of (e) the organic sulfur compound is more than 5.0 parts by mass, the obtained golf ball has a great compression deformation amount and thus the resilience thereof may be lowered.

[(f) Metal Compound]

In the case that the co-crosslinking agent of the core rubber composition consists of the α,β-unsaturated carboxylic acid having 3 to 8 carbon atoms, the core rubber composition preferably further contains (f) a metal compound. This is because if the α,β-unsaturated carboxylic acid having 3 to 8 carbon atoms is neutralized with the metal compound in the core rubber composition, substantially the same effect as using the metal salt of the α,β-unsaturated carboxylic acid having 3 to 8 carbon atoms as the co-crosslinking agent is provided. It is noted that in the case that the α,β-unsaturated carboxylic acid having 3 to 8 carbon atoms and the metal salt thereof are used in combination as the co-crosslinking agent, (f) the metal compound may be used as an optional component.

(f) The metal compound is not particularly limited as long as it can neutralize (b) the α,β-unsaturated carboxylic acid having 3 to 8 carbon atoms in the core rubber composition. Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. As (f) the metal compound, the divalent metal compound is preferable, the zinc compound is more preferable. This is because the divalent metal compound reacts with the α,β-unsaturated carboxylic acid having 3 to 8 carbon atoms to form a metal crosslinking. In addition, if the zinc compound is used, the obtained golf ball has better resilience.

(f) The metal compound may be used solely, or at least two of them may be used in combination. In addition, the amount of (f) the metal compound may be appropriately adjusted based on the desired neutralization degree of (b) the α,β-unsaturated carboxylic acid having 3 to 8 carbon atoms.

The core rubber composition used in the present invention may further contain an additive such as a pigment, a filler for adjusting weight or the like, a peptizing agent, and a softener, where necessary.

The filler blended in the core rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, and molybdenum powder. As the filler, zinc oxide is particularly preferable. It is considered that zinc oxide acts as a vulcanizing aid to increase the hardness of the core as a whole. The amount of the filler is preferably 0.5 part by mass or more, more preferably 1 part by mass or more, and is preferably 30 parts by mass or less, more preferably 25 parts by mass or less, and even more preferably 20 parts by mass or less with respect to 100 parts by mass of (a) the base rubber. If the amount of the filler is less than 0.5 part by mass, it is difficult to adjust the weight, and if the amount of the filler is more than 30 parts by mass, the weight proportion of the rubber component is decreased and thus the resilience tends to be lowered.

The amount of the peptizing agent is preferably 0.1 part by mass or more and 5 parts by mass or less with respect to 100 parts by mass of (a) the base rubber.

[Core]

The core of the golf ball according to the present invention can be obtained by mixing and kneading the above core rubber composition, and molding the same in a mold. The molding conditions are not particularly limited, but the molding is generally carried out at a temperature ranging from 130° C. to 200° C. under a pressure of from 2.9 MPa to 11.8 MPa for 10 minutes to 60 minutes. For example, it is preferable that the molding is carried out by heating the core rubber composition at a temperature ranging from 130° C. to 200° C. for 10 minutes to 60 minutes, or alternatively, by molding the core rubber composition in a two-step heating, i.e. heated at a temperature ranging from 130° C. to 150° C. for 20 minutes to 40 minutes and then heated at a temperature ranging from 160° C. to 180° C. for 5 minutes to 15 minutes.

The surface hardness (Hs) of the core of the golf ball according to the present invention is preferably 60 or more, more preferably 62 or more, and even more preferably 65 or more, and is preferably 93 or less, more preferably 90 or less, and even more preferably 88 or less in Shore C hardness. If the surface hardness (Hs) of the core is 60 or more in Shore C hardness, the core has better resilience. In addition, if the surface hardness (Hs) of the core is 93 or less in Shore C hardness, the core has further enhanced shot feeling on driver shots.

The center hardness (Ho) of the core is preferably 30 or more, more preferably 35 or more, and even more preferably 40 or more in Shore C hardness. If the center hardness (Ho) of the core is 30 or more in Shore C hardness, the core does not become excessively soft and thus has better resilience. In addition, the center hardness (Ho) of the core is preferably 70 or less, more preferably 68 or less, and even more preferably 67 or less in Shore C hardness. If the center hardness (Ho) of the core is 70 or less in Shore C hardness, the core does not become excessively hard and thus has better shot feeling.

The hardness difference (Hs–Ho) between the surface hardness (Hs) and the center hardness (Ho) of the core is preferably 5 or more, more preferably 6 or more, and even more preferably 8 or more, and is preferably 35 or less, more preferably 30 or less, and even more preferably 28 or less in Shore C hardness. If the hardness difference (Hs–Ho) between the surface hardness (Hs) and the center hardness (Ho) of the core is 5 or more in Shore C hardness, the obtained golf ball has better resilience. In addition, if the hardness difference (Hs–Ho) between the surface hardness (Hs) and the center hardness (Ho) of the core is 35 or less in Shore C hardness, the obtained golf ball has further enhanced shot feeling on driver shots.

The diameter of the core of the golf ball according to the present invention is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the core is 34.8 mm or more, the cover does not become excessively thick and thus the resilience is better. On the other hand, if the diameter of the core is 42.2 mm or less, the cover does not become excessively thin and thus functions better.

When the core has a diameter in a range of from 34.8 mm to 42.2 mm, the compression deformation amount (shrinking amount along the compression direction) of the core when applying a load from 98 N as an initial load to 1275 N as a final load to the core is preferably 2.0 mm or more, more preferably 2.3 mm or more, and even more preferably 2.5 mm or more, and is preferably 5.0 mm or less, more preferably 4.5 mm or less, and even more preferably 4.3 mm or less. If the compression deformation amount is 2.0 mm or more, the shot feeling is better, and if the compression deformation amount is 5.0 mm or less, the resilience is better.

[Cover]

The cover of the golf ball according to the present invention is formed from a cover composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Rabalon (registered trademark)" available from Mitsubishi Chemical Corporation.

Examples of the ionomer resin include a product obtained by neutralizing at least a part of carboxyl groups in a binary copolymer composed of an olefin and an $\alpha,\beta$-unsaturated carboxylic acid having 3 to 8 carbon atoms with a metal ion; a product obtained by neutralizing at least a part of carboxyl groups in a ternary copolymer composed of an olefin, an $\alpha,\beta$-unsaturated carboxylic acid having 3 to 8 carbon atoms and an $\alpha,\beta$-unsaturated carboxylic acid ester with a metal ion; and a mixture thereof. The olefin is preferably an olefin having 2 to 8 carbon atoms. Examples of the olefin include ethylene, propylene, butene, pentene, hexene, heptene and octene, and ethylene is particularly preferred. Examples of the $\alpha,\beta$-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the $\alpha,\beta$-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred. Among them, as the ionomer resin, a metal ion neutralized product of ethylene-(meth)acrylic acid binary copolymer or a metal ion neutralized product of ethylene-(meth)acrylic acid-(meth)acrylic acid ester ternary copolymer is preferred.

The cover composition for forming the cover of the golf ball according to the present invention preferably contains a thermoplastic polyurethane elastomer or an ionomer resin as the resin component. It is also preferred that when the ionomer resin is used, a thermoplastic styrene elastomer is used in combination. The amount of the polyurethane or ionomer resin in the resin component of the cover composition is preferably 50 mass % or more, more preferably 60 mass % or more, and even more preferably 70 mass % or more.

In addition to the resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener, as long as they do not impair the performance of the cover.

The amount of the white pigment (e.g. titanium oxide) is preferably 0.5 part or more, more preferably 1 part or more, and is preferably 10 parts or less, more preferably 8 parts or less, with respect to 100 parts by mass of the resin component constituting the cover. If the amount of the white pigment is 0.5 part by mass or more, it is possible to impart the opacity to the resultant cover. In addition, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and even more preferably 60 or more in shore D hardness, and preferably has a slab hardness of 80 or less, more preferably 70 or less, and even more preferably 68 or less in shore D hardness. If the cover composition has a slab hardness of 50 or more, the obtained golf ball has a higher launch angle and a lower spin rate on driver shots and iron shots, and thus travels a greater distance. In addition, if the cover composition has a slab hardness of 80 or less, the obtained golf ball has better durability. Further, in case of a so-called spin golf ball which focuses on controllability, the cover composition preferably has a slab hardness of less than 50 in Shore D hardness, and preferably has a slab hardness of 20 or more, more preferably 25 or more, and even more preferably 30 or more in shore D hardness. If the cover composition has a slab hardness of less than 50 in Shore D hardness, the obtained golf ball readily stops on the green due to the high spin rate on approach shots. In addition, if the cover composition has a slab hardness of 20 or more in Shore D hardness, the abrasion resistance is enhanced. In case of a plurality of cover layers, the slab hardness of the cover composition constituting each layer may be identical or different.

Examples of the method of molding the cover of the golf ball according to the present invention include a method which comprises molding the cover composition into a hollow shell, covering the core with a plurality of the hollow shells and performing compression molding (preferably a method which comprises molding the cover composition into a hollow half-shell, covering the core with two of the half-shells and performing compression molding); and a method which comprises injection molding the cover composition directly onto the core.

When molding the cover in a compression molding method, molding of the half shell can be performed by either the compression molding method or the injection molding method, and the compression molding method is preferred. Compression molding the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, the half shell having a uniform thickness can be formed. Examples of the method for molding the cover by using the half shell include a method which comprises covering the core with two of the half shells and then performing compression molding. Compression molding half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, the golf ball cover having a uniform thickness can be formed.

In the case of injection molding the cover composition into the cover, the cover composition extruded in a pellet form may be used for injection molding, or the cover materials such as the base resin components and the pigment may be dry blended, followed by directly injection molding the blended material. It is preferred to use upper and lower molds having a hemi-spherical cavity and pimples for forming the cover, wherein a part of the pimples also serves as a retractable hold pin. When molding the cover by injection molding, the hold pin is protruded to hold the core, the cover composition is charged and then cooled to obtain the cover. For example, the cover composition heated at a temperature ranging from 200° C. to 250° C. is charged into a mold held under a pressure of 9 MPa to 15 MPa for 0.5 to 5 seconds, and after cooling for 10 to 60 seconds, the mold is opened to obtain the cover.

Concave portions called "dimples" are usually formed on the surface of the cover when the cover is molded. The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the size of the respective dimple is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The thickness of the cover is preferably 4.0 mm or less, more preferably 3.0 mm or less, and even more preferably 2.0 mm or less. If the cover has a thickness of 4.0 mm or less, the resultant golf ball has better resilience or shot feeling. The thickness of the cover is preferably 0.3 mm or more, more preferably 0.5 mm or more, and even more preferably 0.8 mm or more. If the cover has a thickness of less than 0.3 mm, the durability or wear resistance of the cover may be lowered. In the case that the golf ball comprises a plurality of cover layers, the total thickness of a plurality of cover layers preferably falls within the above range.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

[Golf Ball]

The construction of the golf ball according to the present invention is not particularly limited, as long as the golf ball comprises a core and at least one cover layer covering the core. The FIGURE is a partially cutaway cross-sectional view of a golf ball 1 according to one embodiment of the present invention. The golf ball 1 has a spherical core 2, and a cover 3 covering the spherical core 2. A plurality of dimples 31 are formed on the surface of the cover. Other portions than the dimples 31 on the surface of the golf ball 1 are lands 32. The golf ball 1 is provided with a paint layer and a mark layer on an outer side of the cover 3, but these layers are not depicted.

The core is preferably spherical. In addition, the construction of the core may be either a single layered construction or a multiple layered construction, and the single layered construction is preferable. Unlike the multiple layered core, the single layered core does not have an energy loss at the interface of the multiple layered core when being hit, and thus has better resilience. In addition, the cover has a construction composed of at least one layer, and may have either a single layered construction or a multiple layered construction composed of at least two layers. Examples of the golf ball according to the present invention include a two-piece golf ball composed of a core and a single layered cover disposed around the core, a multi-piece golf ball (including a three-piece golf ball) composed of a core and at least two cover layers disposed around the core, and a wound golf ball composed of a core, a rubber thread layer formed around the core and a cover disposed around the rubber thread layer. The present invention can be suitably applied to any one of the above golf balls.

The golf ball according to the present invention preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball according to the present invention preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

When the golf ball has a diameter in a range of from 40 mm to 45 mm, the compression deformation amount (shrinking amount along the compression direction) of the golf ball when applying a load from an initial load of 98 N to a final load of 1275 N to the golf ball is preferably 2.0 mm or more, more preferably 2.3 mm or more, and even more preferably 2.5 mm or more, and is preferably 4.0 mm or less, more preferably 3.5 mm or less, and even more preferably 3.3 mm or less. If the compression deformation amount is 2.0 mm or more, the golf ball does not become excessively hard, and thus has better shot feeling. On the other hand, if the compression deformation amount is 4.0 mm or less, the golf ball has better resilience.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Compression Deformation Amount (mm)

The deformation amount along the compression direction of the core or golf ball (shrinking amount along the compression direction of the core or golf ball), when applying a load from an initial load of 98 N to a final load of 1275 N to the core or golf ball, was measured.

(2) Core Hardness (Shore C Hardness)

The Shore C hardness measured at the surface of the core by using an automatic hardness tester Digitest II available from Bareiss company was adopted as the surface hardness of the core. In addition, the core was cut into two hemispheres to obtain a cut plane, and the hardness at the central point of the cut plane was measured.

(3) Slab Hardness (Shore D Hardness)

Sheets with a thickness of about 2 mm were produced by injection molding the cover composition. The sheets were stored at a temperature of 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(4) Durability

A W #1 driver provided with a metal head (XXIO S, loft angel: 11°, available from Sumitomo Rubber Industries, Ltd.) was installed on a swing robot M/C available from Golf Laboratories, Inc. The golf ball was hit repeatedly at a head speed of 45 m/sec until a crack occurred, and the hitting times until the crack occurred was counted. It is noted that the measurement was conducted using twelve samples for each golf ball, and the average value thereof was adopted as the hitting times for that golf ball. It is noted that the hitting times of the golf ball No. 38 was defined as 100, and the hitting times of each golf ball was represented by converting the hitting times of each golf ball into this index.

Evaluation Standard:

E (Excellent): 110 or more

G (Good): 100 or more and less than 110

F (Fair): 90 or more and less than 100

P (Poor): less than 90

[Production of Golf Ball]
(1) Production of Core

According to the formulations shown in Tables 1-6, the rubber compositions were kneaded with a kneading roll, and heat-pressed in upper and lower molds, each having a hemispherical cavity, at a temperature of 170° C. for 30 minutes to produce spherical cores having a diameter of 39.7 mm. It is noted that barium sulfate was added in an appropriate amount such that the obtained golf ball had a mass of 45.3 g.

TABLE 1

| | | Golf ball No. | 1 | 2 | 3 | 4 | 5 | 6 | 7 | 38 |
|---|---|---|---|---|---|---|---|---|---|---|
| Rubber composition | Amount (parts by mass) | (a) BR730 | 100 | 100 | 100 | 100 | 100 | 100 | 100 | 100 |
| | | (b) ZDA | 27.8 | 27.8 | 34.4 | 36.6 | 44.1 | 51.4 | 58.7 | 27.8 |
| | | (c) Dicumyl peroxide | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 |
| | | Barium sulfate | *) | *) | *) | *) | *) | *) | *) | *) |
| | | (d) BHT | 0.1 | 0.5 | 3 | 5 | 10 | 15 | 20 | — |
| | | Amount of component (b) (phr) (excluding 10% of Zn stearate contained therein) | 25.0 | 25.0 | 31.0 | 32.9 | 39.7 | 46.3 | 52.8 | 25.0 |
| | | Amount of component (b) (mole) | 0.121 | 0.121 | 0.149 | 0.159 | 0.191 | 0.223 | 0.255 | 0.121 |
| | | Amount of component (d) (phr) | 0.1 | 0.5 | 3.0 | 5.0 | 10.0 | 15.0 | 20.0 | — |
| | | Molecular weight of component (d) (g/mole) | 220.35 | 220.35 | 220.35 | 220.35 | 220.35 | 220.35 | 220.35 | — |
| | | Amount of component (d) (mole) | 0.000 | 0.002 | 0.014 | 0.023 | 0.045 | 0.068 | 0.091 | — |
| | | Number of OH functional group in component (d) | 1 | 1 | 1 | 1 | 1 | 1 | 1 | — |
| | | HF/B | 0.004 | 0.019 | 0.091 | 0.143 | 0.237 | 0.305 | 0.356 | — |
| | | HF | 0.000 | 0.002 | 0.014 | 0.023 | 0.045 | 0.068 | 0.091 | — |
| | | Number of OH functional group in component (d) × amount (phr) of component (d) | 0.10 | 0.50 | 3.00 | 5.00 | 10.00 | 15.00 | 20.00 | — |
| Core | | Compression deformation amount (mm) | 3.2 | 3.2 | 3.2 | 3.2 | 3.2 | 3.2 | 3.2 | 3.2 |
| | | Center hardness H0 | 63.2 | 63.2 | 60.2 | 60.0 | 60.0 | 60.0 | 60.0 | 63.2 |
| | | Surface hardness Hs | 87.3 | 87.3 | 85.3 | 83.6 | 83.6 | 83.6 | 83.6 | 87.3 |

TABLE 1-continued

| | Golf ball No. | 1 | 2 | 3 | 4 | 5 | 6 | 7 | 38 |
|---|---|---|---|---|---|---|---|---|---|
| Golf ball | Compression deformation amount (mm) | 2.8 | 2.8 | 2.8 | 2.8 | 2.8 | 2.8 | 2.8 | 2.8 |
| | Durability | F | F | E | E | E | G | P | Standard |

*): Appropriate amount

TABLE 2

| | | | Golf ball No. | 8 | 9 | 10 | 11 | 12 | 38 |
|---|---|---|---|---|---|---|---|---|---|
| Rubber composition | Amount (parts by mass) | (a) BR730 | | 100 | 100 | 100 | 100 | 100 | 100 |
| | | (b) ZDA | | 27.8 | 27.8 | 33.1 | 37.0 | 40.9 | 27.8 |
| | | (c) Dicumyl peroxide | | 0.8 | 0.8 | 0.8 | 0.8 | 0.8 | 0.8 |
| | | (f) Zinc oxide | | 5.0 | 5.0 | 5.0 | 5.0 | 5.0 | 5.0 |
| | | Barium sulfate | | *) | *) | *) | *) | *) | *) |
| | | (d) AO-50 | | 0.1 | 0.5 | 5 | 10 | 15 | — |
| | Amount of component (b) (phr) (excluding 10% of Zn stearate contained therein) | | | 25.0 | 25.0 | 29.8 | 33.3 | 36.8 | 25.0 |
| | Amount of component (b) (mole) | | | 0.121 | 0.121 | 0.144 | 0.160 | 0.177 | 0.121 |
| | Amount of component (d) (phr) | | | 0.1 | 0.5 | 5.0 | 10.0 | 15.0 | — |
| | Molecular weight of component (d) (g/mole) | | | 530.88 | 530.88 | 530.88 | 530.88 | 530.88 | — |
| | Amount of component (d) (mole) | | | 0.000 | 0.001 | 0.009 | 0.019 | 0.028 | — |
| | Number of OH functional group in component (d) | | | 1 | 1 | 1 | 1 | 1 | — |
| | HF/B | | | 0.002 | 0.008 | 0.066 | 0.117 | 0.159 | — |
| | HF | | | 0.000 | 0.001 | 0.009 | 0.019 | 0.028 | — |
| | Number of OH functional group in component (d) × amount (phr) of component (d) | | | 0.10 | 0.50 | 5.00 | 10.00 | 15.00 | — |
| Core | Compression deformation amount (mm) | | | 3.2 | 3.2 | 3.2 | 3.2 | 3.2 | 3.2 |
| | Center hardness H0 | | | 63.2 | 63.2 | 60.0 | 60.0 | 60.0 | 63.2 |
| | Surface hardness Hs | | | 87.3 | 87.3 | 84.6 | 84.6 | 84.6 | 87.3 |
| Golf ball | Compression deformation amount (mm) | | | 2.8 | 2.8 | 2.8 | 2.8 | 2.8 | 2.8 |
| | Durability | | | F | F | E | E | G | Standard |

*): Appropriate amount

TABLE 3

| | | | Golf ball No. | 13 | 14 | 15 | 16 | 17 | 18 | 38 |
|---|---|---|---|---|---|---|---|---|---|---|
| Rubber composition | Amount (parts by mass) | (a) BR730 | | 100 | 100 | 100 | 100 | 100 | 100 | 100 |
| | | (b) ZDA | | 27.8 | 27.8 | 34.9 | 40.4 | 51.4 | 62.3 | 27.8 |
| | | (c) Dicumyl peroxide | | 0.8 | 0.8 | 0.8 | 0.8 | 0.8 | 0.8 | 0.8 |
| | | (f) Zinc oxide | | 5.0 | 5.0 | 5.0 | 5.0 | 5.0 | 5.0 | 5.0 |
| | | Barium sulfate | | *) | *) | *) | *) | *) | *) | *) |
| | | (d) 4,4'-Methylene bis(2,6-di-tert-butylphenol) | | 0.1 | 0.5 | 2.5 | 5 | 10 | 15 | — |
| | Amount of component (b) (phr) (excluding 10% of Zn stearate contained therein) | | | 25.0 | 25.0 | 31.5 | 36.4 | 46.3 | 56.1 | 25.0 |
| | Amount of component (b) (mole) | | | 0.121 | 0.121 | 0.152 | 0.175 | 0.223 | 0.270 | 0.121 |
| | Amount of component (d) (phr) | | | 0.1 | 0.5 | 2.5 | 5.0 | 10.0 | 15.0 | — |
| | Molecular weight of component (d) (g/mole) | | | 424.67 | 424.67 | 424.67 | 424.67 | 424.67 | 424.67 | — |
| | Amount of component (d) (mole) | | | 0.000 | 0.001 | 0.006 | 0.012 | 0.024 | 0.035 | — |
| | Number of OH functional group in component (d) | | | 2 | 2 | 2 | 2 | 2 | 2 | — |
| | HF/B | | | 0.004 | 0.020 | 0.078 | 0.134 | 0.211 | 0.261 | — |
| | HF | | | 0.000 | 0.002 | 0.012 | 0.024 | 0.047 | 0.071 | — |
| | Number of OH functional group in component (d) × amount (phr) of component (d) | | | 0.20 | 1.00 | 5.00 | 10.00 | 20.00 | 30.00 | — |
| Core | Compression deformation amount (mm) | | | 3.2 | 3.2 | 3.2 | 3.2 | 3.2 | 3.2 | 3.2 |
| | Center hardness H0 | | | 63.2 | 63.2 | 60.2 | 60.0 | 60.0 | 60.0 | 63.2 |
| | Surface hardness Hs | | | 87.3 | 87.3 | 85.3 | 83.6 | 83.6 | 83.6 | 87.3 |
| Golf ball | Compression deformation amount (mm) | | | 2.8 | 2.8 | 2.8 | 2.8 | 2.8 | 2.8 | 2.8 |
| | Durability | | | F | F | E | E | E | G | Standard |

*): Appropriate amount

TABLE 4

| | | | Golf ball No. | 19 | 20 | 21 | 22 | 23 | 24 | 38 |
|---|---|---|---|---|---|---|---|---|---|---|
| Rubber composition | Amount (parts by mass) | (a) BR730 | | 100 | 100 | 100 | 100 | 100 | 100 | 100 |
| | | (b) ZDA | | 27.8 | 27.8 | 34.4 | 36.6 | 44.1 | 51.4 | 27.8 |
| | | (c) Dicumyl peroxide | | 0.8 | 0.8 | 0.8 | 0.8 | 0.8 | 0.8 | 0.8 |
| | | (f) Zinc oxide | | 5.0 | 5.0 | 5.0 | 5.0 | 5.0 | 5.0 | 5.0 |

TABLE 4-continued

| | Golf ball No. | 19 | 20 | 21 | 22 | 23 | 24 | 38 |
|---|---|---|---|---|---|---|---|---|
| | Barium sulfate | *) | *) | *) | *) | *) | *) | *) |
| | (d) Probucol | 0.1 | 0.5 | 2.5 | 5 | 10 | 15 | — |
| | Amount of component (b) (phr) (excluding 10% of Zn stearate contained therein) | 25.0 | 25.0 | 31.0 | 32.9 | 39.7 | 46.3 | 25.0 |
| | Amount of component (b) (mole) | 0.121 | 0.121 | 0.149 | 0.159 | 0.191 | 0.223 | 0.121 |
| | Amount of component (d) (phr) | 0.1 | 0.5 | 2.5 | 5.0 | 10.0 | 15.0 | — |
| | Molecular weight of component (d) (g/mole) | 516.84 | 516.84 | 516.84 | 516.84 | 516.84 | 516.84 | — |
| | Amount of component (d) (mole) | 0.000 | 0.001 | 0.005 | 0.010 | 0.019 | 0.029 | — |
| | Number of OH functional group in component (d) | 2 | 2 | 2 | 2 | 2 | 2 | — |
| | HF/B | 0.003 | 0.016 | 0.065 | 0.122 | 0.202 | 0.260 | — |
| | HF | 0.000 | 0.002 | 0.010 | 0.019 | 0.039 | 0.058 | — |
| | Number of OH functional group in component (d) × amount (phr) of component (d) | 0.20 | 1.00 | 5.00 | 10.00 | 20.00 | 30.00 | — |
| Core | Compression deformation amount (mm) | 3.2 | 3.2 | 3.2 | 3.2 | 3.2 | 3.2 | 3.2 |
| | Center hardness H0 | 63.2 | 63.2 | 60.2 | 60.0 | 60.0 | 60.0 | 63.2 |
| | Surface hardness Hs | 87.3 | 87.3 | 85.3 | 83.6 | 83.6 | 83.6 | 87.3 |
| Golf ball | Compression deformation amount (mm) | 2.8 | 2.8 | 2.8 | 2.8 | 2.8 | 2.8 | 2.8 |
| | Durability | F | F | E | E | E | G | Standard |

*): Appropriate amount

TABLE 5

| | | Golf ball No. | 25 | 26 | 27 | 28 | 29 | 30 | 38 |
|---|---|---|---|---|---|---|---|---|---|
| Rubber composition | Amount (parts by mass) | (a) BR730 | 100 | 100 | 100 | 100 | 100 | 100 | 100 |
| | | (b) ZDA | 27.8 | 27.8 | 32.4 | 32.5 | 32.8 | 33.5 | 27.8 |
| | | (c) Dicumyl peroxide | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 |
| | | Barium sulfate | *) | *) | *) | *) | *) | *) | *) |
| | | (d) AO-20 | 0.1 | 0.5 | 2.5 | 5 | 10 | 20 | — |
| | Amount of component (b) (phr) (excluding 10% of Zn stearate contained therein) | | 25.0 | 25.0 | 29.2 | 29.3 | 29.6 | 30.2 | 25.0 |
| | Amount of component (b) (mole) | | 0.121 | 0.121 | 0.141 | 0.141 | 0.142 | 0.145 | 0.121 |
| | Amount of component (d) (phr) | | 0.1 | 0.5 | 2.5 | 5.0 | 10.0 | 20.0 | — |
| | Molecular weight of component (d) (g/mole) | | 784.10 | 784.10 | 784.10 | 784.10 | 784.10 | 784.10 | — |
| | Amount of component (d) (mole) | | 0.000 | 0.001 | 0.003 | 0.006 | 0.013 | 0.026 | — |
| | Number of OH functional group in component (d) | | 3 | 3 | 3 | 3 | 3 | 3 | — |
| | HF/B | | 0.003 | 0.016 | 0.068 | 0.136 | 0.269 | 0.527 | — |
| | HF | | 0.000 | 0.002 | 0.010 | 0.019 | 0.038 | 0.077 | — |
| | Number of OH functional group in component (d) × amount (phr) of component (d) | | 0.30 | 1.50 | 7.50 | 15.00 | 30.00 | 60.00 | — |
| Core | Compression deformation amount (mm) | | 3.2 | 3.2 | 3.2 | 3.2 | 3.2 | 3.2 | 3.2 |
| | Center hardness H0 | | 63.2 | 63.2 | 60.2 | 57.2 | 57.0 | 57.0 | 63.2 |
| | Surface hardness Hs | | 87.3 | 87.3 | 85.3 | 83.9 | 84.4 | 84.4 | 87.3 |
| Golf ball | Compression deformation amount (mm) | | 2.8 | 2.8 | 2.8 | 2.8 | 2.8 | 2.8 | 2.8 |
| | Durability | | F | F | E | E | E | P | Standard |

*): Appropriate amount

TABLE 6

| | | Golf ball No. | 31 | 32 | 33 | 34 | 35 | 36 | 37 | 38 |
|---|---|---|---|---|---|---|---|---|---|---|
| Rubber composition | Amount (parts by mass) | (a) BR730 | 100 | 100 | 100 | 100 | 100 | 100 | 100 | 100 |
| | | (b) ZDA | 27.8 | 27.8 | 30.6 | 32.3 | 35.6 | 38.9 | 42.2 | 27.8 |
| | | (c) Dicumyl peroxide | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 |
| | | Barium sulfate | *) | *) | *) | *) | *) | *) | *) | *) |
| | | (d) AO-60 | 0.1 | 0.5 | 2.5 | 5 | 10 | 15 | 20 | — |
| | Amount of component (b) (phr) (excluding 10% of Zn stearate contained therein) | | 25.0 | 25.0 | 27.5 | 29.0 | 32.0 | 35.0 | 38.0 | 25.0 |
| | Amount of component (b) (mole) | | 0.121 | 0.121 | 0.133 | 0.140 | 0.154 | 0.169 | 0.183 | 0.121 |
| | Amount of component (d) (phr) | | 0.1 | 0.5 | 2.5 | 5.0 | 10.0 | 15.0 | 20.0 | — |
| | Molecular weight of component (d) (g/mole) | | 1177.66 | 1177.66 | 1177.66 | 1177.66 | 1177.66 | 1177.66 | 1177.66 | — |
| | Amount of component (d) (mole) | | 0.000 | 0.000 | 0.002 | 0.004 | 0.008 | 0.013 | 0.017 | — |
| | Number of OH functional group in component (d) | | 4 | 4 | 4 | 4 | 4 | 4 | 4 | — |
| | HF/B | | 0.003 | 0.014 | 0.064 | 0.121 | 0.220 | 0.302 | 0.371 | — |
| | HF | | 0.000 | 0.002 | 0.008 | 0.017 | 0.034 | 0.051 | 0.068 | — |

TABLE 6-continued

| | Golf ball No. | 31 | 32 | 33 | 34 | 35 | 36 | 37 | 38 |
|---|---|---|---|---|---|---|---|---|---|
| | Number of OH functional group in component (d) × amount (phr) of component (d) | 0.40 | 2.00 | 10.00 | 20.00 | 40.00 | 60.00 | 80.00 | — |
| Core | Compression deformation amount (mm) | 3.2 | 3.2 | 3.2 | 3.2 | 3.2 | 3.2 | 3.2 | 3.2 |
| | Center hardness H0 | 63.2 | 63.2 | 60.6 | 59.8 | 59.8 | 59.8 | 59.8 | 63.2 |
| | Surface hardness Hs | 87.3 | 87.3 | 84.8 | 83.8 | 83.8 | 83.8 | 83.8 | 87.3 |
| Golf ball | Compression deformation amount (mm) | 2.8 | 2.8 | 2.8 | 2.8 | 2.8 | 2.8 | 2.8 | 2.8 |
| | Durability | F | F | E | E | E | G | P | Standard |

*): Appropriate amount

The materials used in Tables 1-6 are shown as follows.

BR730: high-cis polybutadiene rubber (cis-1,4 bond amount=95 mass %, 1,2-vinyl bond amount=1.3 mass %, Moony viscosity (ML$_{1+4}$(100° C.))=55, molecular weight distribution (Mw/Mn)=3) available from JSR Corporation ZDA: zinc acrylate ZN-DA90S (containing 10% of zinc stearate) available from Nisshoku Techno Fine Chemical Co., Ltd.

Dicumyl peroxide: available from Tokyo Chemical Industry Co., Ltd.

Zinc oxide: "Ginrei R" available from Toho Zinc Co., Ltd.

Barium sulfate: "Barium sulfate BD" available from Sakai Chemical Industry Co., Ltd.

BHT: dibutylhydroxy toluene available from Tokyo Zairyo Co., Ltd.

AO-20: 1,3,5-tris-(3,5-di-tert-butyl-4-hydroxybenzyl)-1, 3-5-triazine-2,4,6 (1H,3H,5H-)-trione available from Adeka Corporation AO-50: octadecyl-3-(3',5'-di-t-butyl-4'-hydroxyphenyl) propionate available from Adeka Corporation AO-60: pentaerythritol tetrakis[3-(3,5-di-tert-butyl-4-hydroxyphenyl) propionate available from Adeka Corporation 4,4'-Methylene bis(2,6-di-tert-butylphenol): available from Tokyo Chemical Industry Co., Ltd.

Probucol: 2,6-di-tert-butyl-4-({2-[(3,5-di-tert-butyl-4-hydroxyphenyl) sulfanyl]propane-2-yl} sulfanyl) phenol available from Tokyo Chemical Industry Co., Ltd.

(2) Production of Cover and Production of Golf Ball

The cover material having the formulation shown in Table 7 was extruded with a twin-screw kneading type extruder to prepare the cover composition in a pellet form. The conditions for extruding the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above such that the formed cover had a thickness of 1.5 mm, to produce golf balls having the spherical core and the cover covering the core. Evaluation results of the obtained golf balls are shown in Tables 1-6.

TABLE 7

| Cover composition No. | 1 |
|---|---|
| Himilan 1555 | 40 |
| Himilan 1605 | 20 |
| Himilan AM7329 | 40 |
| Titanium dioxide (A220) | 3 |
| JF-90 | 0.2 |
| Hardness (Shore D) | 63 |

Formulation: parts by mass

The materials used in Table 7 are shown as follows.

Himilan 1555: Na neutralized ionomer available from Du Pont-Mitsui Polychemicals Co., Ltd.

Himilan 1605: Na neutralized ionomer available from Du Pont-Mitsui Polychemicals Co., Ltd.

Himilan AM7329: Zn neutralized ionomer available from Du Pont-Mitsui Polychemicals Co., Ltd.

A-220: titanium dioxide available from Ishihara Sangyo Kaisha, Ltd.

JF-90: light stabilizer available from Johoku Chemical Co., Ltd.

As shown in Tables 1-6, each of the golf balls according to the present invention has excellent durability.

The present invention is suitably applicable for a golf ball.

This application is based on Japanese Patent application No. 2019-089955 filed on May 10, 2019, the contents of which are hereby incorporated by reference.

The invention claimed is:

1. A golf ball comprising a core and at least one cover layer covering the core, wherein
   the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a hindered phenol compound,
   (b) the co-crosslinking agent and (d) the hindered phenol compound are blended in the core rubber composition such that the following expression (1) is satisfied:

$$0.04 \leq HF/B \leq 0.35 \tag{1}$$

in the formula (1),
   HF=a number of OH functional group in one molecule of (d) the hindered phenol compound×an amount (mole) of (d) the hindered phenol compound with respect to 100 parts by mass of (a) the base rubber, and
   B=an amount (mole) of (b) the co-crosslinking agent with respect to 100 parts by mass of (a) the base rubber, and
   an amount of (d) the hindered phenol compound ranges from 2 parts by mass to 20 parts by mass with respect to 100 parts by mass of (a) the base rubber.

2. The golf ball according to claim 1, wherein $0.06 \leq HF/B \leq 0.32$.

3. The golf ball according to claim 1, wherein the following expression (2) is further satisfied: $0.005 \leq HF \leq 0.09$ (2).

4. The golf ball according to claim 1, wherein an amount of (b) the co-crosslinking agent is 0.12 mole or more and 0.30 mole or less with respect to 100 parts by mass of (a) the base rubber.

5. The golf ball according to claim 1, wherein (d) the hindered phenol compound is a compound having a 3-tertbutyl-4-hydoroxylphenyl structure or a compound having a 3,5-di-tert-butyl-4-hydroxyphenyl structure.

6. The golf ball according to claim 1, wherein (d) the hindered phenol compound is at least one compound selected from the group consisting of dibutylhydroxy toluene, octadecyl-3-(3,5-di-tert-butyl-4-hydroxyphenyl) propionate, 4,4'-methylene bis(2,6-di-tert-butylphenol), 2,6-di-tert-butyl-4-({2-[(3,5-di-tert-butyl-4-hydroxyphenyl)sulfanyl]propane-2-yl}sulfanyl)phenol, 1,3,5-tris(3,5-di-tert-butyl-4-hydroxybenzyl)-1,3,5-triazine-2,4,6-(1H,3H,5H)-trione, and pentaerythritol tetrakis[3-(3,5-di-tert-butyl-4-hydroxyphenyl) propionate.

7. The golf ball according to claim 1, wherein the amount of (d) the hindered phenol compound ranges from 3 parts by mass to 20 parts by mass with respect to 100 parts by mass of (a) the base rubber.

8. The golf ball according to claim 1, wherein the core rubber composition further contains (e) an organic sulfur compound.

9. The golf ball according to claim 1, wherein a surface hardness (Hs) of the core ranges from 60 to 93 in Shore C hardness, a center hardness (Ho) of the core ranges from 30 to 70 in Shore C hardness, and a hardness difference (Hs–Ho) between the surface hardness (Hs) and the center hardness (Ho) ranges from 5 to 35 in Shore C hardness.

10. The golf ball according to claim 1, wherein the core has a diameter in a range of from 34.8 mm to 42.2 mm, and has a compression deformation amount ranging from 2.0 mm to 5.0 mm when applying a load from 98 N as an initial load to 1275 N as a final load to the core.

* * * * *